United States Patent
Villaron et al.

(10) Patent No.: US 7,614,000 B2
(45) Date of Patent: Nov. 3, 2009

(54) FILE FORMATS, METHODS, AND COMPUTER PROGRAM PRODUCTS FOR REPRESENTING PRESENTATIONS

(75) Inventors: Shawn A. Villaron, San Jose, CA (US); Sharad K. Garg, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 11/018,910

(22) Filed: Dec. 20, 2004

(65) Prior Publication Data

US 2006/0136827 A1 Jun. 22, 2006

(51) Int. Cl.
G06F 17/00 (2006.01)
(52) U.S. Cl. .............. 715/730; 715/200; 715/201; 715/202; 715/203; 715/204; 715/209; 715/210; 715/211; 715/234; 715/243; 715/731; 715/732
(58) Field of Classification Search .......... 715/500, 715/500.1, 730, 732, 200–204, 209–211, 715/234, 243
See application file for complete search history.

(56) References Cited

U.S. PATENT DOCUMENTS

| | | |
|---|---|---|
| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,222,205 A | 6/1993 | Larson et al. |
| 5,267,155 A | 11/1993 | Buchanan et al. |
| 5,469,533 A | 11/1995 | Dennis |
| 5,487,138 A | 1/1996 | Rust et al. |
| 5,537,526 A | 7/1996 | Anderson et al. |
| 5,579,466 A | 11/1996 | Habib et al. |

(Continued)

FOREIGN PATENT DOCUMENTS

EP 1 376 387 A2 1/2004

(Continued)

OTHER PUBLICATIONS

OpenOffice.org, "OpenOffice.org User Guide for Version 1.1.x: Chapter 5: Creating Presentations with Impress", published May 7, 2004, pp. 1,2, 255-286, http://documentation.openoffice.org/manuals/OOo1.x.x/user_guide.pdf.*

(Continued)

*Primary Examiner*—Stephen S Hong
*Assistant Examiner*—David Faber
(74) *Attorney, Agent, or Firm*—Merchant & Gould P.C.

(57) ABSTRACT

File formats, methods, and computer program products are provided for representing a presentation in a modular content framework. The modular content framework may include a file format container associated with modular parts. A file format includes logically separate modular parts that are associated with each other by one or more relationships where each modular part is associated with a relationship type. The modular parts include a presentation part representing a start part for the presentation, a slide master part associated with the presentation part, and a slide layout part associated with the slide master part. The modular parts may also include a document properties part containing built-in properties associated with the file format, a thumbnail part containing associated thumbnails, and a slide part containing a slide in the presentation. Each modular part is capable of being interrogated separately, extracted from the presentation, and/or reused in a different presentation.

19 Claims, 7 Drawing Sheets

U.S. PATENT DOCUMENTS

| | | |
|---|---|---|
| 5,579,519 A | 11/1996 | Pelletier |
| 5,613,124 A | 3/1997 | Atkinson et al. |
| 5,655,130 A | 8/1997 | Dodge et al. |
| 5,675,788 A | 10/1997 | Husick et al. |
| 5,701,342 A | 12/1997 | Anderson et al. |
| 5,745,910 A | 4/1998 | Piersol et al. |
| 5,752,055 A | 5/1998 | Redpath et al. |
| 5,752,056 A | 5/1998 | Celik |
| 5,819,295 A | 10/1998 | Nakagawa et al. |
| 5,845,058 A | 12/1998 | Shaw et al. |
| 5,893,109 A | 4/1999 | DeRose et al. |
| 5,903,903 A | 5/1999 | Kennedy |
| 5,903,905 A | 5/1999 | Andersen et al. |
| 5,905,504 A | 5/1999 | Barkans et al. |
| 5,911,776 A | 6/1999 | Guck |
| 5,950,215 A | 9/1999 | Tabuchi |
| 5,960,168 A | 9/1999 | Shaw et al. |
| 5,993,088 A | 11/1999 | Nogay et al. |
| 6,023,714 A | 2/2000 | Hill et al. |
| 6,026,416 A | 2/2000 | Kanerva et al. |
| 6,067,531 A | 5/2000 | Hoyt et al. |
| 6,094,665 A | 7/2000 | Lyons et al. |
| 6,134,552 A | 10/2000 | Fritz et al. |
| 6,144,974 A | 11/2000 | Gartland |
| 6,175,845 B1 | 1/2001 | Smith et al. |
| 6,182,080 B1 | 1/2001 | Clements |
| 6,182,096 B1 | 1/2001 | Mastie et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders et al. |
| 6,342,904 B1 | 1/2002 | Vasudevan et al. |
| 6,362,870 B2 | 3/2002 | Mui et al. |
| 6,393,441 B1 | 5/2002 | Kanerva et al. |
| 6,407,821 B1 | 6/2002 | Hohensee et al. |
| 6,418,448 B1 | 7/2002 | Sarkar |
| 6,449,653 B2 | 9/2002 | Klemets et al. |
| 6,457,017 B2 | 9/2002 | Watkins et al. |
| 6,480,206 B2 | 11/2002 | Prinzing |
| 6,484,189 B1 | 11/2002 | Gerlach et al. |
| 6,496,206 B1 * | 12/2002 | Mernyk et al. ............... 715/835 |
| 6,507,856 B1 | 1/2003 | Kanerva et al. |
| 6,509,974 B1 | 1/2003 | Hansen |
| 6,538,760 B1 | 3/2003 | deBry et al. |
| 6,549,918 B1 | 4/2003 | Probert, Jr. et al. |
| 6,583,789 B1 | 6/2003 | Carlson et al. |
| 6,591,278 B1 | 7/2003 | Ernst |
| 6,604,144 B1 | 8/2003 | Anders |
| 6,608,693 B1 | 8/2003 | Loyd et al. |
| 6,609,200 B2 | 8/2003 | Anderson et al. |
| 6,654,737 B1 | 11/2003 | Nunez |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,694,485 B1 | 2/2004 | Kelley et al. |
| 6,715,126 B1 | 3/2004 | Chang et al. |
| 6,763,343 B1 | 7/2004 | Brooke et al. |
| 6,771,291 B1 | 8/2004 | DiStefano, III |
| 6,781,609 B1 | 8/2004 | Barker et al. |
| 6,785,673 B1 | 8/2004 | Fernandez |
| 6,789,229 B1 | 9/2004 | Dunietz et al. |
| 6,812,941 B1 | 11/2004 | Brown et al. |
| 6,871,321 B2 | 3/2005 | Wakayama |
| 6,910,843 B2 | 6/2005 | Saw et al. |
| 6,912,555 B2 | 6/2005 | Lemon et al. |
| 6,918,082 B1 | 7/2005 | Gross et al. |
| 6,925,597 B2 | 8/2005 | Anwar |
| 6,925,631 B2 | 8/2005 | Golden |
| 6,931,590 B2 | 8/2005 | Kanie et al. |
| 6,938,203 B1 | 8/2005 | Dimarco et al. |
| 6,941,510 B1 | 9/2005 | Ozzie et al. |
| 6,952,801 B2 | 10/2005 | Warmus et al. |
| 6,961,902 B2 | 11/2005 | Anecki et al. |
| 6,981,207 B1 | 12/2005 | Bakman et al. |
| 6,993,527 B1 | 1/2006 | Raman et al. |
| 7,036,076 B2 | 4/2006 | Anwar |
| 7,051,276 B1 | 5/2006 | Mogilevsky et al. |
| 7,054,841 B1 | 5/2006 | Tenorio |
| 7,080,083 B2 | 7/2006 | Kim et al. |
| 7,134,071 B2 | 11/2006 | Ohwada et al. |
| 7,168,035 B1 | 1/2007 | Bell et al. |
| 7,171,618 B2 | 1/2007 | Harrington et al. |
| 7,290,205 B2 | 10/2007 | Moncsko et al. |
| 7,301,544 B2 | 11/2007 | Yuan |
| 7,412,649 B2 | 8/2008 | Emek et al. |
| 7,418,652 B2 | 8/2008 | Ornstein et al. |
| 7,487,448 B2 | 2/2009 | Emerson et al. |
| 7,549,118 B2 | 6/2009 | Shur et al. |
| 2001/0003828 A1 | 6/2001 | Peterson et al. |
| 2001/0013043 A1 | 8/2001 | Wagner |
| 2001/0016842 A1 | 8/2001 | Umen et al. |
| 2001/0018697 A1 | 8/2001 | Kunitake et al. |
| 2001/0034739 A1 | 10/2001 | Anecki et al. |
| 2001/0039552 A1 | 11/2001 | Killi et al. |
| 2001/0044809 A1 | 11/2001 | Parasnis et al. |
| 2001/0044813 A1 | 11/2001 | Frank |
| 2001/0051962 A1 | 12/2001 | Plotkin |
| 2001/0054042 A1 | 12/2001 | Watkins et al. |
| 2002/0004805 A1 | 1/2002 | Nojima et al. |
| 2002/0016800 A1 | 2/2002 | Spivak et al. |
| 2002/0038348 A1 | 3/2002 | Malone et al. |
| 2002/0049790 A1 | 4/2002 | Ricker et al. |
| 2002/0059265 A1 | 5/2002 | Valorose |
| 2002/0059337 A1 | 5/2002 | Takaoka et al. |
| 2002/0065848 A1 | 5/2002 | Walker et al. |
| 2002/0065857 A1 | 5/2002 | Michalewicz |
| 2002/0073236 A1 | 6/2002 | Helgeson et al. |
| 2002/0087602 A1 | 7/2002 | Masuda et al. |
| 2002/0099797 A1 | 7/2002 | Merrell et al. |
| 2002/0103835 A1 | 8/2002 | Kearney |
| 2002/0107886 A1 | 8/2002 | Gentner et al. |
| 2002/0111133 A1 | 8/2002 | Wittkotter |
| 2002/0116421 A1 | 8/2002 | Fox et al. |
| 2002/0120647 A1 | 8/2002 | Amano |
| 2002/0129058 A1 | 9/2002 | Story et al. |
| 2002/0174145 A1 | 11/2002 | Duga et al. |
| 2002/0184263 A1 | 12/2002 | Perinet et al. |
| 2002/0188638 A1 | 12/2002 | Hamscher |
| 2002/0194220 A1 | 12/2002 | Sluiman |
| 2003/0004957 A1 | 1/2003 | Broman et al. |
| 2003/0023637 A1 | 1/2003 | Halahmi |
| 2003/0028560 A1 | 2/2003 | Kudrolli et al. |
| 2003/0033287 A1 | 2/2003 | Shanahan et al. |
| 2003/0065946 A1 | 4/2003 | Holliday et al. |
| 2003/0074633 A1 | 4/2003 | Boulmakoul et al. |
| 2003/0079181 A1 | 4/2003 | Schumacher et al. |
| 2003/0093520 A1 | 5/2003 | Beesley |
| 2003/0115547 A1 | 6/2003 | Ohwada et al. |
| 2003/0120671 A1 | 6/2003 | Kim et al. |
| 2003/0126136 A1 | 7/2003 | Omoigui |
| 2003/0126260 A1 | 7/2003 | Husain et al. |
| 2003/0137539 A1 | 7/2003 | Dees |
| 2003/0142128 A1 | 7/2003 | Reulein et al. |
| 2003/0145134 A1 | 7/2003 | Wehage et al. |
| 2003/0149934 A1 | 8/2003 | Worden ..................... 715/513 |
| 2003/0149935 A1 | 8/2003 | Takizawa et al. ............ 715/513 |
| 2003/0158851 A1 | 8/2003 | Britton et al. |
| 2003/0163552 A1 | 8/2003 | Savitzky et al. |
| 2003/0167446 A1 | 9/2003 | Thomas ..................... 715/513 |
| 2003/0172168 A1 | 9/2003 | Mak et al. |

| | | |
|---|---|---|
| 2003/0172343 A1 | 9/2003 | Leymaster et al. |
| 2003/0177446 A1 | 9/2003 | Gropper et al. |
| 2003/0177449 A1 | 9/2003 | Rose .................... 715/530 |
| 2003/0182450 A1 | 9/2003 | Ong et al. |
| 2003/0182656 A1 | 9/2003 | Leathers et al. |
| 2003/0195784 A1 | 10/2003 | Smith |
| 2003/0196176 A1 | 10/2003 | Abu-Ghazalah et al. |
| 2003/0221167 A1 | 11/2003 | Goldstein et al. .......... 715/513 |
| 2003/0222890 A1 | 12/2003 | Salesin et al. |
| 2003/0229845 A1 | 12/2003 | Salesin et al. |
| 2003/0233420 A1 | 12/2003 | Stark et al. |
| 2003/0237048 A1 | 12/2003 | Jones et al. |
| 2003/0237049 A1 | 12/2003 | Sawicki et al. |
| 2004/0003343 A1 | 1/2004 | Liao et al. |
| 2004/0003388 A1 | 1/2004 | Jacquemot et al. |
| 2004/0015782 A1 | 1/2004 | Day et al. |
| 2004/0015890 A1 | 1/2004 | Wong et al. |
| 2004/0015908 A1 | 1/2004 | Giel et al. |
| 2004/0019853 A1 | 1/2004 | Takizawa et al. ........... 715/523 |
| 2004/0030711 A1 | 2/2004 | Roudot |
| 2004/0030987 A1 | 2/2004 | Manelli |
| 2004/0034848 A1 | 2/2004 | Moore et al. |
| 2004/0049737 A1 | 3/2004 | Simon et al. |
| 2004/0054669 A1 | 3/2004 | Seyrat et al. |
| 2004/0054697 A1 | 3/2004 | Brandenberger |
| 2004/0066527 A1 | 4/2004 | Kloosterman et al. |
| 2004/0078755 A1 | 4/2004 | Shinjo et al. |
| 2004/0088332 A1 | 5/2004 | Lee et al. |
| 2004/0103073 A1 | 5/2004 | Blake et al. |
| 2004/0117733 A1 | 6/2004 | Moreau et al. |
| 2004/0128535 A1 | 7/2004 | Cheng |
| 2004/0128623 A1 | 7/2004 | Hudson |
| 2004/0139049 A1 | 7/2004 | Hancock et al. |
| 2004/0148278 A1 | 7/2004 | Milo et al. |
| 2004/0148567 A1 | 7/2004 | Jeon et al. |
| 2004/0153467 A1 | 8/2004 | Conover et al. |
| 2004/0172584 A1 | 9/2004 | Jones et al. |
| 2004/0172592 A1 | 9/2004 | Collie et al. |
| 2004/0181753 A1 | 9/2004 | Michaelides |
| 2004/0183837 A1 | 9/2004 | Watanabe et al. |
| 2004/0194025 A1 | 9/2004 | Hubert et al. |
| 2004/0205533 A1 | 10/2004 | Lopata et al. |
| 2004/0205539 A1 | 10/2004 | Mak et al. |
| 2004/0205580 A1 | 10/2004 | De Angelis et al. |
| 2004/0205623 A1 | 10/2004 | Weil et al. |
| 2004/0205653 A1 | 10/2004 | Hadfield et al. |
| 2004/0205656 A1 | 10/2004 | Reulein et al. |
| 2004/0216048 A1 | 10/2004 | Brown et al. |
| 2004/0221233 A1 | 11/2004 | Thielen |
| 2004/0226012 A1 | 11/2004 | Awada et al. |
| 2004/0230894 A1 | 11/2004 | Elza et al. |
| 2004/0243551 A1 | 12/2004 | Boone et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts .................... 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |
| 2005/0144556 A1 | 6/2005 | Petersen et al. |
| 2005/0177784 A1 | 8/2005 | Andrews et al. |
| 2005/0192813 A1 | 9/2005 | Richard |
| 2005/0198561 A1 | 9/2005 | McAuley |
| 2005/0204016 A1 | 9/2005 | McAuley |
| 2005/0210026 A1 | 9/2005 | Wood |
| 2005/0223312 A1 | 10/2005 | Erdtmann et al. |
| 2005/0246724 A1 | 11/2005 | Foehr et al. |
| 2005/0248790 A1 | 11/2005 | Ornstein et al. |
| 2005/0249536 A1 | 11/2005 | Sedky et al. |
| 2005/0251739 A1 | 11/2005 | Shur et al. |
| 2005/0251740 A1 | 11/2005 | Shur et al. |
| 2005/0251742 A1 | 11/2005 | Mogilevsky et al. |
| 2005/0268221 A1 | 12/2005 | Shur et al. |
| 2005/0278616 A1 | 12/2005 | Eller |
| 2005/0278626 A1 | 12/2005 | Malik |
| 2006/0010371 A1 | 1/2006 | Shur et al. |
| 2006/0026585 A1 | 2/2006 | Haselden et al. |
| 2006/0031749 A1 | 2/2006 | Schramm et al. |
| 2006/0031758 A1 | 2/2006 | Shur et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080314 A1 | 4/2006 | Hubert et al. |
| 2006/0080316 A1 | 4/2006 | Gilmore et al. |
| 2006/0080603 A1 | 4/2006 | Bailey et al. |
| 2006/0095834 A1 | 5/2006 | Jeon et al. |
| 2006/0117019 A1 | 6/2006 | Sylthe et al. |
| 2006/0136809 A1 | 6/2006 | Fernstrom |
| 2006/0155529 A1 | 7/2006 | Ludviksson et al. |
| 2006/0168562 A1 | 7/2006 | Emek et al. |
| 2006/0206794 A1 | 9/2006 | Ornstein et al. |
| 2006/0227150 A1 | 10/2006 | Yuan |
| 2007/0061384 A1 | 3/2007 | Harrington et al. |
| 2007/0136443 A1 | 6/2007 | Sah et al. |

FOREIGN PATENT DOCUMENTS

| | | |
|---|---|---|
| EP | 1 452 966 A2 | 11/2004 |
| EP | 1 672 528 A2 | 12/2005 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| WO | WO 2006/133053 A2 | 12/2006 |
| ZA | 2005/09350 | 4/2008 |

OTHER PUBLICATIONS

U.S. Appl. No. 11/018,912 filed Dec. 20, 2004, entitled "File Formats, Methods, and Computer Program Products for Workbooks".

U.S. Appl. No. 11/018,718 filed Dec. 20, 2004, entitled "File Formats, Methods, and Computer Program Products for Representing Documents".

U.S. Appl. No. 11/019,088 filed Dec. 20, 2004, entitled "Management and Use of Data in a Computer-Generated Document".

U.S. Appl. No. 10/731,900 filed Dec. 9, 2003, entitled "Context Free Document Portions."

U.S. Appl. No. 11/018,405, filed Dec. 20, 2004, entitled "Context Free Document Portions With Alternate Formats."

U.S. Appl. No. 11/125,907, filed May 10, 2005, entitled "Structuring an Electronic Document for Efficient Identification and Use of Document Parts,".

U.S. Appl. No. 11/072,188 filed Mar. 4, 2005, entitled "Method and Apparatus for Utilizing an Object Model to Manage Document Parts for Use in an Electronic Document".

U.S. Appl. No. 11/072,659 filed Mar. 4, 2005 entitled "Method and Apparatus for Utilizing an Extensible Markup Language Schema to Defined Document Parts for Use in an Electronic Document".

U.S. Appl. No. 11/398,339 filed Apr. 5, 2006 entitled "Structuring Data for Word Processing Documents".

U.S. Appl. No. 11/445,903 filed Jun. 2, 2006 entitled "Structuring Data for Presentation Documents".

U.S. Appl. No. 11/431,931 filed May 10, 2006 entitled "Exposing Embedded Data in a Computer-Generated Document".
U.S. Appl. No. 11/389,367 filed Mar. 24, 2006 entitled "Structuring Data for Spreadsheet Application Documents".
U.S. Appl. No. 10/955,622 filed Sep. 30, 2004 entitled "Method, System, and Computer-Readable Medium for Creating, Inserting and Reusing Document Parts in an Electronic Document".
U.S. Appl. No. 11/018,569 filed Dec. 20, 2004 entitled "Method and System for Linking Data ranges of a Computer-Generated Document with Associated Extensible Markup Language Elements".
U.S. Official Action mailed May 14, 2008 in U.S. Appl. No. 10/731,900, Jones et al., 11 pages.
U.S. Official Action mailed Jun. 26, 2008 in U.S. Appl. No. 11/072,659, Bailey et al., 12 pages.
U.S. Official Action mailed Jul. 09, 2008 in U.S. Appl. No. 11/019,088, Bishop et al., 31 pages.
"Introduction to SpreadsheetML", Online Helpfile 'OFFICEXMLSDK.CHM' extracted from 'OFFICE2003XMLSCHEMA.Exe', Dec. 5, 2003 http://www.microsoft.com/downloads/details.aspx?familyid=fe118952-3547-420a-a412- 00a2662442d9&displaying=en, retrieved on Apr. 10, 2008, 58 pp.
"Comparative Assessment of Open Documents Formats Market Overview - Valoris", 2003, http://europa.eu/int/idabc/en/document/3439, retrieved on Apr. 10, 2008, 40 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.
U.S. Official Action mailed Oct. 18, 2005 in U.S. Appl. No. 10/837,040, 10 pp.
U.S. Official Action mailed Feb. 28, 2007 in U.S. Appl. No. 10/731,900, 16 pp.
U.S. Official Action mailed Mar. 7, 2007 in U.S. Appl. No. 11/081,912, 23 pp.
U.S. Official Action mailed Jul. 26, 2007 in U.S. Appl. No. 11/018,569, 11 pp.
U.S. Official Action mailed Aug. 09, 2007 in U.S. Appl. No. 10/731,900, 10 pp.
U.S. Official Action mailed Jul. 22, 2008 in U.S. Appl. No. 11/072,188, 26 pp.
U.S. Official Action mailed Oct. 30, 2008 in U.S. Appl. No. 11/125,907, 18 pp.
U.S. Official Action mailed Nov. 14, 2008 in U.S. Appl. No. 11/072,659, 29 pp.
European Search Report dated Nov. 30, 2007 in EP 05105111.8, 3 pp.
European Examination Report dated Mar. 14, 2008 in EP 05105111.8, 5 pp.
European Examination Report dated Mar. 26, 2008 in EP 05111677.0, 5 pp.
European Search Report dated Apr. 22, 2008 in EP 05111549.1, 11 pp.
PCT Search Report dated Jun. 25, 2008 in PCT/US2006/21673 (14917.0187), 10 pp.
Chinese Office Action dated Jul. 18, 2008 in 200510126789.6, 31 pp.
European Communication dated Jul. 22, 2008 in EP 05111549.1, 8 pp.
Chinese Office Action dated Aug. 1, 2008 in 200510126792.8, 20 pp.
Chinese Office Action dated Aug. 1, 2008 in 200510126798.5, 26 pp.
Chinese Office Action dated Aug. 22, 2008 in 200510125059.04, 28 pp.
Chinese Office Action dated Oct. 31, 2008 in 200510125058.X, 15 pp.
European Search Report dated Dec. 15, 2008 in EP 05111511.1, 7 pp.
"@try inCSS3 (was: Useragent Rules in CSS)", http://lists.w3.org/Archives/Public/www-style/2004Mar/0333.html, 2 pages (Mar. 31, 2004).
"Controlling the Data Chaos by Adding Intelligence to Media", 4 pages (2004).
"Open eBook Publication Structure 1.2", http://www.idpf.org/oebps/oebps1.2/download/oeb12-xhtml.htm, 71 pages (Aug. 27, 2002).
Bleuthman et al., "Interleaved Graphics and Text", IBM Technical Disclosure Bulletin, vol. 22, No. 11, pp. 4813-4815 (Apr. 1980).
Chien et al., "Efficient Schemes for Managing Multiversion XML Documents", The VLDB Journal, vol. 11, pp. 332-353 (2002).
Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).
El-Kwae et al., "Document Image Representation Using XML Technologies", Proceedings of SPIE, vol. 4670, pp. 109-120 (2002).
Ellis, "Postscrip, Bezier Curves and Chinese Characters", ACM, pp. 162-165 (1989).
Girardot et al., "Efficient Representation and Streaming of XML Content Over the Internet Medium", IEEE, pp. 67-70 (2000).
Halvorson et al., "Microsoft Office XP Inside Out, 2001", Microsoft Press, pp. 272, 273 and 289.
Han et al., "WebSplitter: a Unified XML Framework for Multi-Device Collaborative Web Browsing", ACM, pp. 221-230 (2000).
Hardy et al., "Mapping and Displaying Structural Transformations Between XML and PDF", ACM 2002, pp. 95-102 (2002).
Holman, "What is XSL-FO", Google Mar. 20, 2002, http://www.xml.com/pub/a/2002/03/20/xsl-fo.html, 18 pp.
Jacobs et al., "Adaptive Grid-Based Document Layout", ACM Transactions on Graphics, vol. 22, No. 2, pp. 838-847 (Jul. 2003).
Marco et al., "A Framework for Designing and Implementing the Ada Standard Container Library", ACM, pp. 49-61 (2003).
Meyer, O. "a Tool-Creating Validated XML Documents on the Fly Using MS Word", pp. 113-121 (Oct. 2002).
Microsoft Word, (hereinafter Word), pp. 1-4 (Copyright 2001).
Miller, "An Introduction to the Resource Description Framework", D-Lib Magazine, ISSN 1082-9873, http://www.dlib.org/dlib/may98/miller/05miller.html, 10 pages (May 1998).
Obasanjo, "Designing Extensible, Versionable XML Formats", Google Jul. 21, 2004, http://www.xml.com/pub/a/2004/07/21/design.html, 17 pp.
Obasanjo, "Designing XML Formats: Versioning vs. Extensibility", Google 2004, blogs.msdn.com/dareobasanjo/archive/2004/04/11/111369.aspx. One additional page is included to show the actual date of the article which is Nov. 17, 2004, 24 pp.
Obasanjo, "Designing XML Formats: Versioning vs. Extensibility, Google Apr. 11, 2004, blogs.msdn.com/dareobasanjo/archive/2004/04/11/111369.aspx, 3 pp.
Office Action Correspondence Subsystem, version 1.3 (herein after OACS), copyright Feb. 2003, pp. 1-2 to 1-123, 2-2 to 2-122 and 3-2 to 3-44).
OpenOffice.org, "OpenOffice.org User Guide for Version 1.1.x: Chapter 4: Spreadsheets in Calc", published May 7, 2004, pp. 1, 2, 179-254, http://documentation.openoffice.org/manuals/OOo1.x.x/user_guide.pdf.
OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OOo1.x.x/user_guide.pdf.
Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pp.
Pawson, "Printing from XML: An Introduction to XSL-FO,", Google Oct. 9, 2002, http://www.xml.com/pub/a/2002/10/09/xslfo.html, 6 pp.
Peters et al., "CrystalWeb-A Distributed Authoring Environment for the World-Wide Web," Computer Networks and ISDN Systems, vol. 27, No. 6, pp. 861-870 (Apr. 1995).
ReplyAssistant, pp. 1-34 (Copyright 2001).
Sahuguet et al., "Building Intelligent Web Applications Using Lightweight Wrappers", Data and Knowledge Engineering, vol. 36, pp. 283-316 (2001).
StarOffice 7 Office Suite, A Sun ONE Software Offering, Basic Programmer's Guide, pp. 1-10, 47, 91, 104 (Jul. 2003).
Steele, "Easy Microsoft Office Word 2003", published Sep. 19, 2003, Que Corp., pp. 52, 53 and 216 (6 total pp.).
Unknown, ReplyAssistant Version 1.1, downloaded from <http://www.goldmedalsoft.com/shareware/Business_Finance-Miscellaneous-ReplyAssistant-1.1.html>, Copyright 2000-2001, 7 figures, 5 pages ReadMet, 1 page About ReplyAssistant, 15 pp.

van Leeuwen et al., "XML for Flexibility and Extensibility of Design Information Models", Proceedings of CAADRIA, University of Sydney, Australia, pp. 491-502 (2001).

Whitmer, R., "Document Object Model (DOM) Level 3 Xpath Specification", W3C, http://www.w3.org/TR/DOM-Level-3-XPath/, Feb. 26, 2004, Version 1.0, 18 pp.

U.S. Official Action mailed Sep. 20, 2005 in U.S. Appl. No. 10/836,326, 23 pp.

U.S. Official Action mailed May 31, 2006 in U.S. Appl. No. 10/836,326, 21 pp.

U.S. Official Action mailed Oct. 20, 2006 in U.S. Appl. No. 10/836,326, 20 pp.

U.S. Official Action mailed Apr. 9, 2007 in U.S. Appl. No. 10/836,326, 18 pp.

U.S. Official Action mailed Jul. 26, 2007 in U.S. Appl. No. 10/836,326, 18 pp.

U.S. Official Action mailed Feb. 22, 2008 in U.S. Appl. No. 10/836,327, 47 pp.

U.S. Official Action mailed Jun. 28, 2006 in U.S. Appl. No. 10/836,608, 22 pp.

U.S. Official Action mailed Dec. 12, 2006 in U.S. Appl. No. 10/836,608, 17 pp.

U.S. Official Action mailed Mar. 8, 2007 in U.S. Appl. No. 10/836,608, 13 pp.

U.S. Official Action mailed Jul. 27, 2007 in U.S. Appl. No. 10/836,608, 17 pp.

U.S. Official Action mailed Jan. 24, 2005 in U.S. Appl. No. 10/837,040, 20 pp.

U.S. Official Action mailed Jul. 15, 2005 in U.S. Appl. No. 10/837,040, 18 pp.

U.S. Official Action mailed Oct. 18, 2005 in U.S. Appl. No. 10/837,040, 10 pp.

U.S. Official Action mailed Apr. 6, 2006 in U.S. Appl. No. 10/837,040, 13 pp.

U.S. Official Action mailed Sep. 29, 2006 in U.S. Appl. No. 10/837,040, 22 pp.

U.S. Official Action mailed Dec. 19, 2006 in U.S. Appl. No. 10/837,040, 9 pp.

U.S. Official Action mailed May 15, 2007 in U.S. Appl. No. 10/837,040, 15 pp.

U.S. Official Action mailed Jun. 14, 2007 in U.S. Appl. No. 10/955,622, 26 pp.

U.S. Official Action mailed Mar. 17, 2008 in U.S. Appl. No. 10/955,622, 30 pp.

U.S. Official Action mailed Aug. 2, 2007 in U.S. Appl. No. 11/018,405, 15 pp.

U.S. Official Action mailed Feb. 21, 2007 in U.S. Appl. No. 11/018,569, 10 pp.

U.S. Official Action mailed Mar. 18, 2008 in U.S. Appl. No. 11/018,569, 16 pp.

U.S. Official Action mailed Jun. 19, 2007 in U.S. Appl. No. 11/018,718, 23 pp.

U.S. Official Action mailed Mar. 21, 2007 in U.S. Appl. No. 11/018,910, 24 pp.

U.S. Official Action mailed Oct. 3, 2007 in U.S. Appl. No. 11/018,910, 18 pp.

U.S. Official Action mailed Oct. 1, 2007 in U.S. Appl. No. 11/018,912, 18 pp.

U.S. Official Action mailed Mar. 21, 2007 in U.S. Appl. No. 11/019,088, 14 pp.

U.S. Official Action mailed May 8, 2007 in U.S. Appl. No. 11/072,188, 12 pp.

U.S. Official Action mailed Dec. 28, 2007 in U.S. Appl. No. 11/072,188, 14 pp.

U.S. Official Action mailed Sep. 17, 2007 in U.S. Appl. No. 11/072,659, 15 pp.

U.S. Official Action mailed Feb. 4, 2008 in U.S. Appl. No. 11/125,907, 19 pp.

U.S. Official Action mailed Aug. 29, 2006 in U.S. Appl. No. 11/222,344, 20 pp.

U.S. Official Action mailed Feb. 22, 2007 in U.S. Appl. No. 11/222,344, 12 pp.

U.S. Official Action mailed Aug. 1, 2007 in U.S. Appl. No. 11/222,344, 13 pp.

U.S. Official Action mailed Oct. 3, 2006 in U.S. Appl. No. 11/222,442, 21 pp.

U.S. Official Action mailed Feb. 20, 2007 in U.S. Appl. No. 11/222,442, 11 pp.

U.S. Official Action mailed Jul. 10, 2007 in U.S. Appl. No. 11/222,442, 12 pp.

U.S. Official Action mailed Jun. 18, 2007 in U.S. Appl. No. 11/398,339, 21 pp.

U.S. Official Action mailed Mar. 25, 2008 in U.S. Appl. No. 11/398,339, 12 pp.

European Search Report dated Nov. 3, 2006 in EP 05111509.5, 10 pp.

European Search Report dated Dec. 19, 2007 in EP 05111677.0, 8 pp.

European Search Report dated Dec. 19, 2007 in EP 05111375.1, 8 pp.

European Search Report dated Dec. 19, 2007 in EP 05112123.4, 7 pp.

European Examination Report dated Mar. 3, 2008 in EP 05111375.1, 6 pp.

Orchard et al. "[Editorial Draft] Versioning XML Languages W3C Proposed TAG Finding", http://www.w3.org/2001/tag/doc/versioning-20031116, Nov. 16, 2003, pp. 1-23.

Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.

Jones, B., "Word XML's Context Free Chunks: Building a Document from Multiple Pieces of Content", http://blogs.msdn.com/brian_jones_archives/2005/07/20/441167.aspx, Jul. 20, 2005, 4 pp.

Chinese Second Office Action dated Mar. 13, 2009 in 200480001395.1 (308874.04), pp. 1-7.

Chinese Second Office Action dated Mar. 27, 2009 in 20040001339.08 (304846.04), pp. 1-7.

Chinese Decision on Rejection dated Mar. 27, 2009 in 200480001336.4 (308877.04), pp. 1-17.

Chinese Decision on Rejection dated May 8, 2009 in 200510125059.04 (60001.0441CC01), pp. 1-14.

Chinese Third Office Action dated Jun. 5, 2009 in 200510126789.6 (60001.0443CC01), pp. 1-7.

Russian Official Action dated Jan. 13, 2008 in 2412-139543RU/8132 (304698.10), pp. 1-9.

Adobe Creative Team, "Adobe Acrobat 5.0 Classroom in a Book", published Jun. 26, 2001, Adobe Press, pp. 1-26+cover page (27 pp.).

European Communication dated Jul. 10, 2009 in EP 05111511.1-1527 (60001.0440EP01), pp. 1-5.

Gudgin, M., "SOAP Version 1.2 Part 1: Messaging Framework", W3C Candidate Recommendation (Dec. 19, 2002), pp. 1-65.

Chinese Second Office Action dated Jun. 5, 2009 in 200480001312.9, pp. 1-9.

Chinese Third Office Action dated Jul. 17, 2009 in 200480001395.01, pp. 1-7.

* cited by examiner

300

Relationship Types Table

| Relationship | Type/Comments |
|---|---|
| codeFile | The target of this relationship is a part that contains code such as Visual Basic for Applications (VBA) projects. |
| comments | The target of this relationship is a part that contains the comments for the referring part. |
| docProps | The target of this relationship is a part that contains all of the built-in document properties for the container. |
| drawing | The target of this relationship is a part that contains a drawing found on the referring part. |
| font | The target of this relationship is a part that contains the definition of a font in use by the referring part. |
| handoutMaster | The target of this relationship is a part that contains the handout master which defines the initial look and feel of handouts for the referring presentation. |
| image | The target of this relationship is a part that contains an image (vector/raster) on the referring part. |
| legacyDrawing | The target of this relationship is a part that contains a drawing found on the referring part. |
| mailEnvelope | The target of this relationship is a part that contains mail envelope information (who the file was sent to, what the subject line was, etc.) for the referring presentation. |
| movie | The target of this relationship is a part that contains a movie found on the referring part. |
| notesMaster | The target of this relationship is a part that contains the notes master which defines the initial look and feel of notes pages for the referring part. |
| notesSlide | The target of this relationship is a part that contains the notes slide for the referring part. |
| embeddedObject | The target of this relationship is a part that contains an embedded document found on the referring part. |
| pptDocument | The target of this relationship is a part that contains the primary presentation part for a PowerPoint presentation. |
| slide | The target of this relationship is a part that contains a slide associated with the referring part. |
| slideLayout | The target of this relationship is a part that contains a slide layout which defines the initial look and feel for a slide part. |
| slideMaster | The target of this relationship is a part that contains the slide master which defines the initial look and feel of a slide or a slide layout. |
| sound | The target of this relationship is a part that contains a sound found on the referring part. |
| styleSheet | The target of this relationship is a part that contains a style sheet that defines basic formatting characteristics available to the referring part. |
| thumbnail | The target of this relationship is a part that contains a thumbnail image for the container. |
| userData | The target of this relationship is a part that contains a block of user-defined XML available for use by the referring container. |

Fig 3a

FILE FORMATS, METHODS, AND COMPUTER PROGRAM PRODUCTS FOR REPRESENTING PRESENTATIONS

CROSS-REFERENCE TO RELATED APPLICATIONS

This patent application is related to and filed with U.S. patent application, Ser. No. 11/018,718, entitled "File Formats, Methods, and Computer Program Products For Representing Documents," filed on Dec. 20, 2004; U.S. patent application Ser. No. 11/019,088, entitled "Management and Use of Data in a Computer-Generated Document," filed on Dec. 20, 2004; and U.S. patent application, Ser. No. 11/018,912, entitled "File Formats, Methods, and Computer Program Products For Representing Workbooks," filed on Dec. 20, 2004; all of which are assigned to the same assignee as this application. The aforementioned patent applications are expressly incorporated herein, in their entirety, by reference.

TECHNICAL FIELD

The present invention generally relates to file formats, and more particularly, is related to methods and formats for representing presentations in a componentized presentation application program.

BACKGROUND

The information age has facilitated an era of building informative slide presentations utilizing presentation software applications. However, the way in which previous file formats are created and structured to store a collection of graphical surfaces, typically called a presentation, has several drawbacks. For instance, previous presentation file formats are created in the form of a single file containing monolithic data. Because proprietary formats are generally used to create these single files, each company that builds presentation storage develops a different file format. Because the data within these different file formats is monolithic and inaccessible in discrete parts, a series of problems are created.

One problem is basic document or slide re-use. For instance, it is very difficult to extract one or more slides from a presentation and reuse the extracted slides in a different presentation and retain slide integrity, even in the same application. Comparatively, reusing slides between different applications, for example from POWERPOINT to HARVARD GRAPHICS, and HARVARD GRAPHICS to FREE LANCE GRAPHICS, is worse. Reusing content on a slide is similarly difficult.

Secondly, because of the single file format, it is practically impossible to lock part of a presentation. Thus, a feature such as multi-user editing, where a number of people perhaps on different platforms, and/or from different locales cooperatively edit a presentation with the help of a locking mechanism, is prohibited. Most of the technology in terms of locking is all done at the file level, thus if a file is locked by a user, no other users can edit the file. Viewing is possible, but not editing.

There is also a problem of document interrogation. Finding content within a presentation, for example finding slides for a 2004 sales forecast, can be a daunting task. It is very difficult to find discrete parts within a monolithic file format presentation where semantics of the content can be determined. Even if a tool is built to interrogate one previous file format, the same tool could not be used to interrogate a different previous file format. This problem exists even when an existing binary file format is documented. It is still difficult to implement reader and writer classes that can handle existing binary file formats well. Even if a tool targeted at an application was developed it could not interrogate all document formats. This problem is referred to as the opaqueness of single file formats.

Still further, due to intermingling of data, the ability to re-brand a presentation, or multiple presentations, is nearly impossible outside of the presentation application. Re-branding a presentation involves taking a slide from presentation A, moving it to presentation B, and making the slide look as though it was authored in the normal authoring context of presentation B. Although, the slide may pick up some colors from the presentation B, the slide will not be displayed as though it was actually authored in presentation B.

Document surfacing, the ability to take pieces of one file formatted document and drop them into another document, is also a problem. For instance, a spreadsheet table copied from a spreadsheet document into a presentation document is difficult to interrogate in a monolithic style file format.

Still further, in the case of document previewing, for instance graphically browsing accessible content, it is very difficult to retrieve a high resolution preview of the content exposed through a shell in a browser or in a third party application. Some presentation applications provide thumbnails or previews of a single slide, but none provide high-resolution previews of all of the slides in a presentation deck.

Accordingly there is an unaddressed need in the industry to address the aforementioned deficiencies and inadequacies.

SUMMARY

Embodiments of the present invention provide file formats, methods, and computer program products for representing a presentation in a modular content framework implemented within a computing apparatus Embodiments of the present invention disclose an open file format, such as an extensible markup language (XML) file format, and a way of creating a file format for storing a collection of graphical surfaces, typically called a presentation. A single graphical surface may be the equivalent of a single slide in a presentation. The file format is designed such that it is made up of collections and parts. Each collection functions as a folder and each modular part functions as a file. These separate files are related together with relationships where each separate file is associated with a relationship type.

One embodiment is a file format for representing a presentation and/or a presentation template in a modular content framework. The modular content framework may include a file format container associated with the modular parts. The file format includes modular parts which are logically separate but associated with one another by one or more relationships. Each modular part is associated with a relationship type and the modular parts include a presentation part representing a start part for the presentation and/or the presentation template, a slide master part associated with the presentation part and/or the presentation template and operative to specify main components of the presentation, and a slide layout part associated with the slide master part and operative to specify a structure of the presentation. Each modular part is capable of being interrogated separately without other modular parts being interrogated, which offers gains in efficiency when the presentation is queried.

The modular parts may also include a document properties part containing built-in properties associated with the file format, a thumbnail part containing thumbnails associated with the file format, and a slide part containing a slide in the presentation. Each modular part is capable of being extracted from and/or copied from the presentation and reused in a different presentation along with associated modular parts identified by traversing the relationships of the modular part reused.

Another embodiment is a method for representing a presentation in a file format wherein modular parts associated with the presentation include each part written into the file format. The method involves writing a presentation part of the file format, querying the presentation for a slide master relationship type, and writing a slide master part of the file format separate from the presentation part. The method also involves establishing a relationship between the slide master part and the presentation part, writing a slide layout part separate from the slide master part, and establishing a relationship between the slide layout part and the slide master part.

Additionally, the method may involve establishing a relationship between the presentation part and a file format container where the file format container includes a document properties part containing built-in properties associated with the file format and a thumbnail part containing thumbnails associated with the file format. The method also involves writing a slide part containing a slide for the presentation separate from the slide master part and slide layout and establishing a relationship between the slide part and the slide layout.

Still further, the method may involve writing modular parts associated with relationship types wherein the modular parts that are to be shared are written only once and establishing relationships between the modular parts written. Writing the modular parts may also involve examining each modular part, determining whether a change has occurred to the modular part examined, and when a change has occurred to the modular part examined, writing the modular part examined including the changes.

Still another embodiment is a computer program product including a computer-readable medium having control logic stored therein for causing a computer to represent a presentation in a file format where modular parts of the file format include each part written into the file format. The control logic includes computer-readable program code for causing the computer to write a presentation part of the file format, query the presentation for a slide master relationship type, write a slide master part of the file format separate from the presentation part, and establish a relationship between the slide master part and the presentation part. The control logic also includes computer-readable program code for causing the computer to write a slide layout part separate from the slide master part and establish a relationship between the slide layout part and the slide master part.

The computer program product also includes computer-readable program code for causing the computer to establish a relationship between the presentation part and a file format container. The file format container includes a document properties part containing built-in properties associated with the file format and a thumbnail part containing thumbnails associated with the file format. The computer-readable program code is also operative to cause the computer to write a slide part containing a slide for the presentation separate from the slide master part and slide layout part and establish a relationship between the slide part and the slide layout part.

The invention may be implemented utilizing a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

BRIEF DESCRIPTION OF THE DRAWINGS

FIGS. 3a-3b are tables illustrating relationship types and collection types utilized in the file format according to various illustrative embodiments of the invention.

DETAILED DESCRIPTION

Figure 1:
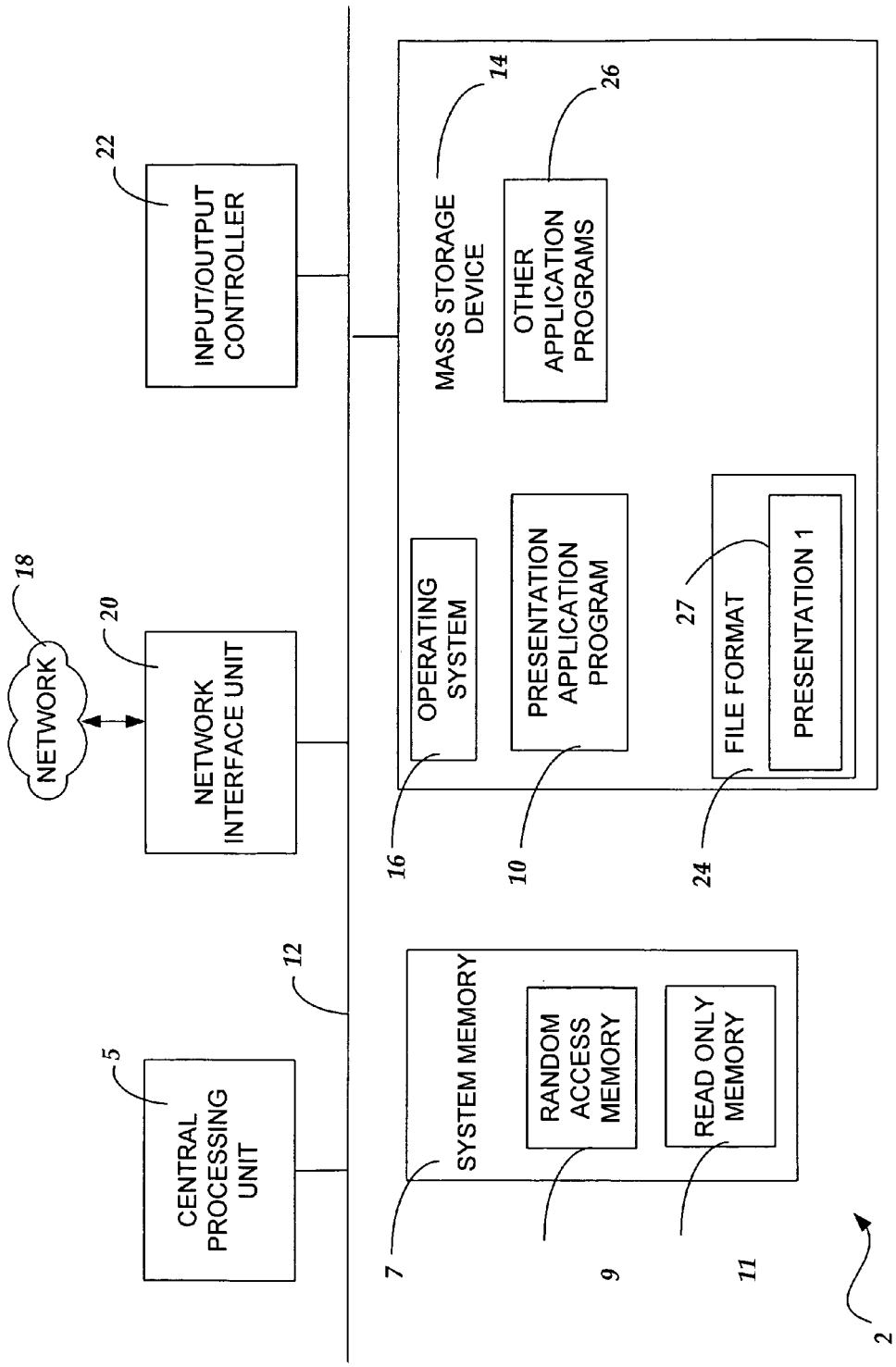
FIG. 1 is a computing system architecture illustrating a computing apparatus utilized in and provided by various illustrative embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, operations, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in an embodiment of the invention will be described. The computer architecture shown in FIG. 1 illustrates a computing apparatus, such as a server, desktop, laptop, or handheld computing apparatus, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVJS"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a presentation application program 10. The presentation application program 10 is operative to provide functionality for the creation and layout of presentations and/or templates for presentations, such as a presentation 27, in an open file format 24, such as an XML file format. According to one embodiment of the invention, the presentation application program 10 and other application programs 26 comprise the OFFICE suite of application programs from MICROSOFT CORPORATION including the WORD, EXCEL, and POWERPOINT application programs.

Figure 2A:
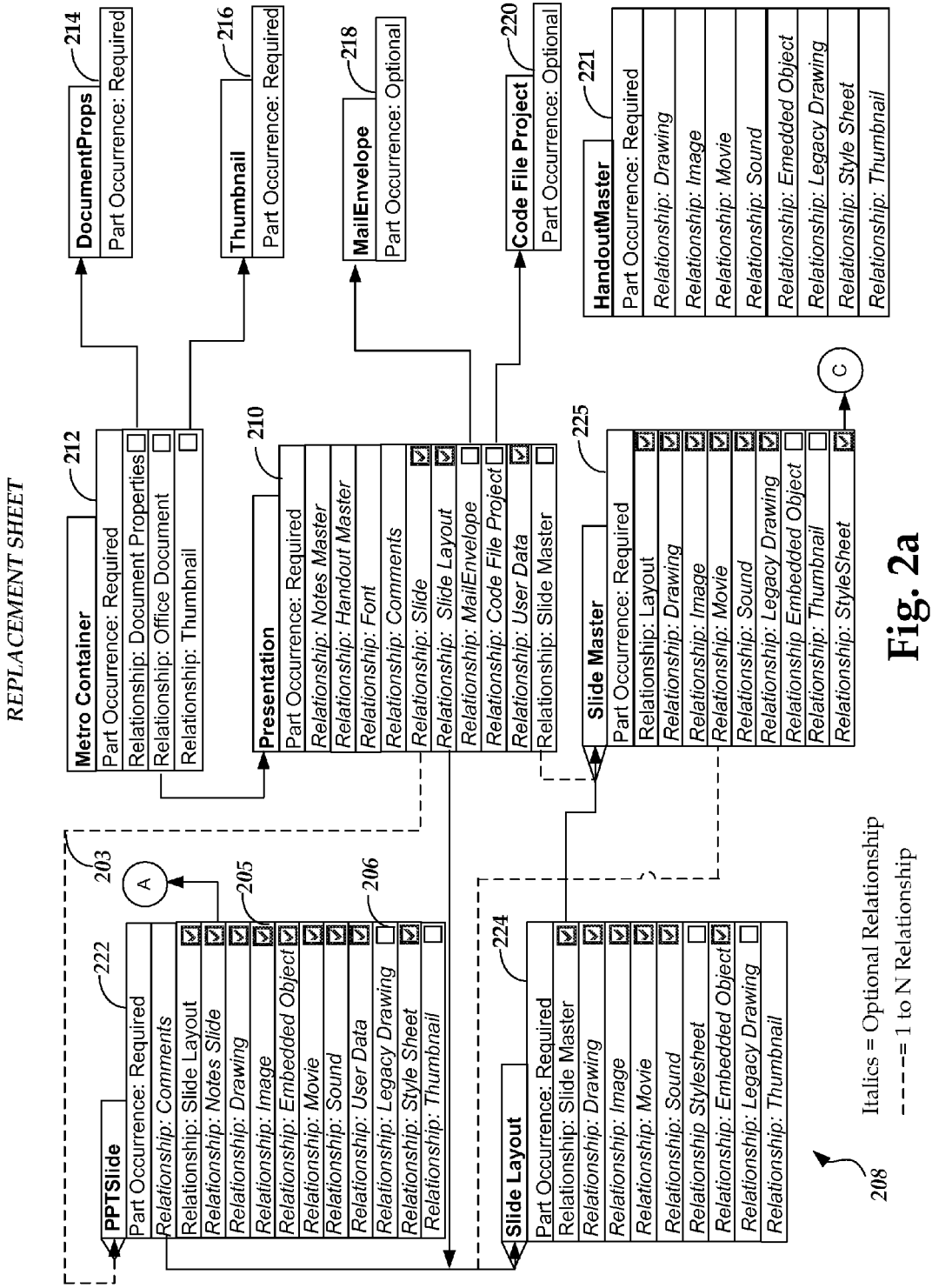
FIGS. 2a-2b are block diagrams illustrating a presentation relationship hierarchy for various modular parts utilized in a file format for representing presentations according to various illustrative embodiments of the invention.
Figure 2B:
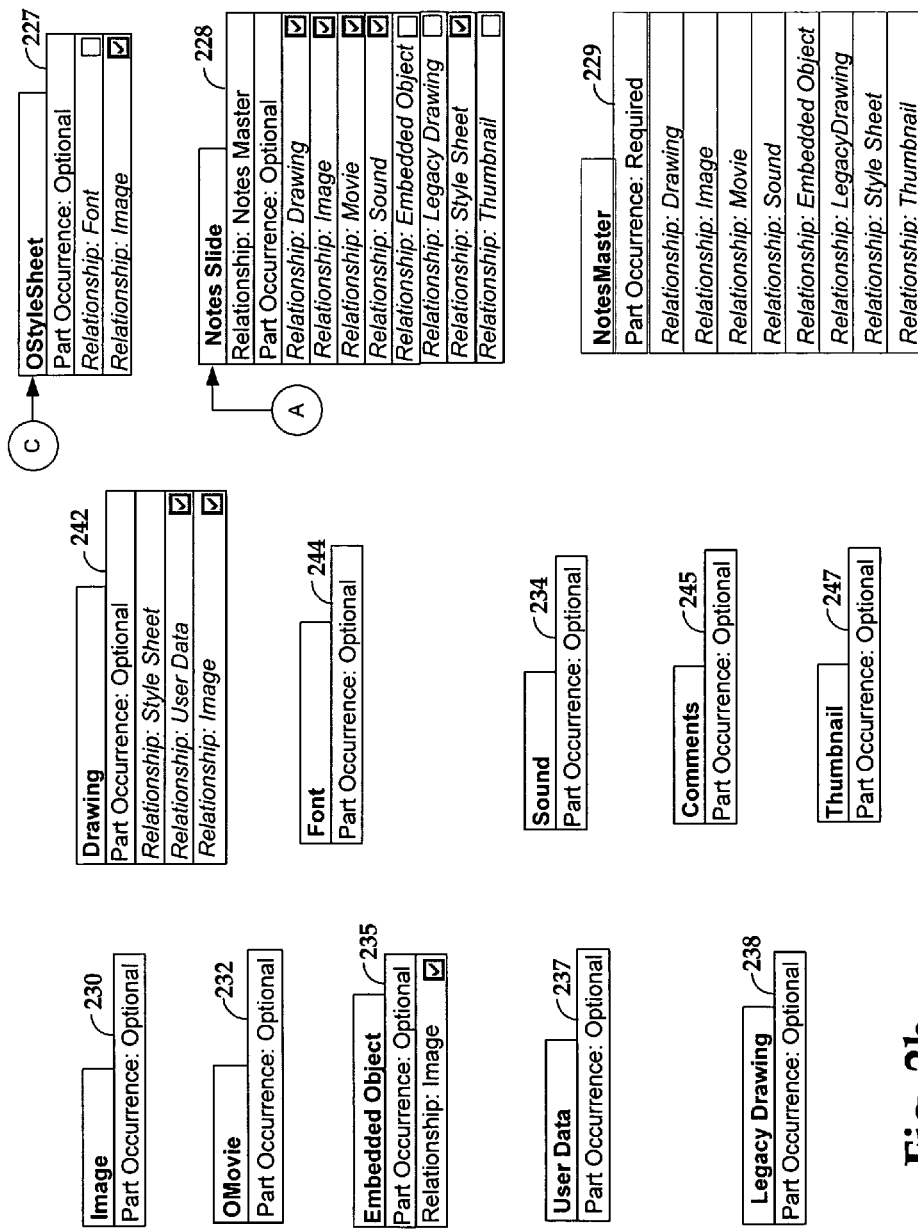

Referring now to FIGS. 2a-2b, block diagrams illustrating a presentation relationship hierarchy 208 for various modular parts utilized in the file format 24 for representing a presentation and/or a presentation template according to various illustrative embodiments of the invention will be described. The presentation relationship hierarchy 208 lists specific presentation application relationships some with an explicit reference indicator 205 indicating an explicit reference to that relationship in the content of the modular part, for example via a relationship identifier. Non-explicit indicators 206, indicate that the modular part may potentially utilize features from the destination part without an explicit reference. Optional relationships with respect to validation are indicated in italics, and dashed connecting lines 203 indicate a one to many relationship. Thus, for example there is a slide part 222 for each slide associated with a presentation.

The various modular parts or components of the presentation hierarchy 208 are logically separate but are associated by one or more relationships. Each modular part is also associated with a relationship type and is capable of being interrogated separately without other modular parts being interrogated. A modular content framework may include a file format container 212 associated with the modular parts. The modular parts include, the presentation part 210 representing a start part for a presentation, a document properties part 214 containing built-in properties associated with the file format 24, and a thumbnail part 216 containing thumbnails associated with the file format 24.

The modular parts also include a slide master part 225 associated with the presentation part 210 and operative to specify main components of the presentation and a slide layout part 224 associated with the slide master part 225 and operative to specify a structure of the presentation. The slide layout part 224 may include a default layout associated with the presentation part 210. The presentation part 210 is associated with the slide master part in a one to many relationship meaning a slide master part 225 will exist for each slide grouping in the file format 24. Further, the slide master part 225 is associated with the slide layout part 224 in a one to many relationship meaning a slide layout part 224 will exist for each slide layout in the presentation. Other modular parts include a slide part 222 containing a slide in the presentation. The presentation part 210 is associated with the slide part 222 in a one to many relationship meaning a slide part 222 will exist for each slide in the presentation. It should be appreciated that each modular part is capable of being extracted and/or copied from the presentation and reused in a different presentation along with associated modular parts. Associated modular parts are identified when the presentation application traverses inbound and outbound relationships of the modular part reused.

Still further, referring to FIGS. 2a-2b, other modular parts may include a style sheet part 227 containing data associated with a style of the presentation, a notes slide part 228 containing notes associated with the slide part 222, a mail envelope part 218 containing envelope data where a user of the presentation has sent the presentation via electronic mail, and a code file part 220, such as a visual basic application (VBA) project part containing VBA project code associated with the presentation. Other modular parts may include an image part 230 containing image data associated with the presentation, a sound part 234 containing audio data associated with the presentation, a movie part 232 containing movie data associated with the presentation, and an embedded object part 235 containing an object associated with the presentation. It should be appreciated that modular parts that are shared in more than one relationship are only written to memory once.

Other modular parts include a user data part 237 containing customized data capable of being read into the presentation and changed, a font part 244 containing one or more fonts associated with the presentation, a legacy drawing object part 238, such as an Escher 1.0 object and a drawing object part 242, such as an Escher 2.0 object both containing an object built using a drawing platform.

Still other modular parts may include a handout master part 221 containing data associated with defining a style of handouts associated with the presentation, a notes master part 229 containing data associated with defining a style of a note page associated with the notes, a comments part 245 containing comments associated with the presentation, and a thumbnail part 247 containing thumbnails associated with the presentation. It should be appreciated that certain modular parts are global and thus, can be used anywhere in the file format. In contrast, some modular parts are non-global and thus, can only be shared on a limited basis.

In various embodiments of the invention, the file format 24 may be formatted according to extensible markup language ("XML") and/or a binary format. As is understood by those skilled in the art, XML is a standard format for communicating data. In the XML data format, a schema is used to provide XML data with a set of grammatical and data type rules governing the types and structure of data that may be communicated. The XML data format is well-known to those skilled in the art, and therefore not discussed in further detail herein.

Figure 3B:
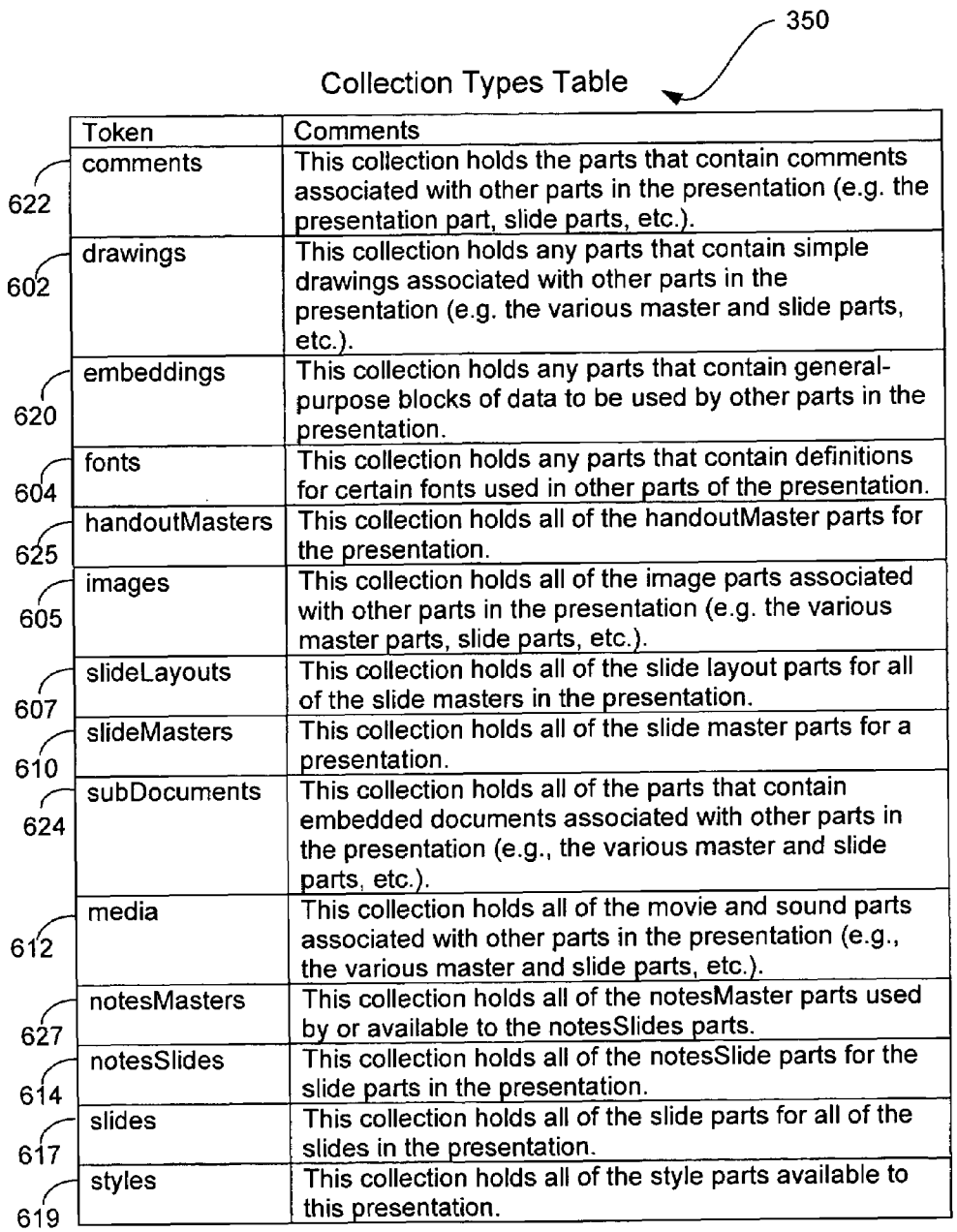

FIGS. 3a-3b are tables 300 illustrating relationship types and table 350 illustrating collection types utilized in the file format 24 according to various illustrative embodiments of the invention. A relationship type table 300 lists the relationship types associated with the modular parts. The relationship types not only identify an association or dependency but also identify the basis of the dependency. The relationship types include a font relationship 302, a code file relationship 303 capable of identifying potentially harmful code files, and a user data relationship 304. The relationship types also include a style sheet relationship 307, a comments relationship 308, an embedded object relationship 310, a legacy drawing object relationship 314, a drawing object relationship 312, an image relationship 317, a sound relationship 318, and a movie relationship 320. Still further, the relationship types may include a mail envelope relationship 322, a document properties relationship 324, a thumbnail relationship 325, a slide relationship 327, a notes slide relationship 328, a slide master relationship 330, and a slide layout relationship 332. Other relationship types include a handout master relationship 335, a notes master relationship 337, and a presentation relationship 340.

Referring to FIGS. 2a-2b and 3b, the table 350 lists collection types for organizing the modular parts. The collection types include a drawings collection 602 that includes the drawing object parts 238 and 242, a fonts collection 604 that includes the font part 244, an images collection 605 that includes the image part 230, and a slide layouts collection 607 that includes the slide layout part 224. The collection types also include a masters collection 610 that includes the slide master part 225, a media collection 612 that includes the movie and the sound parts 232 and 234, and a notes slides collection 614 that collection includes the note slides part 228.

Still further, the collection types may include a slides collection 617 that includes the slide part 222, a styles collection 619 that includes the styles sheet part 227, an embeddings collection 620 that includes the embedded object part 235 and the user data part 237, a comments collection 622 including the comments part 245, a subdocuments collection 624, a handout masters collection 625, and a notes masters collection 627.

Figure 4:
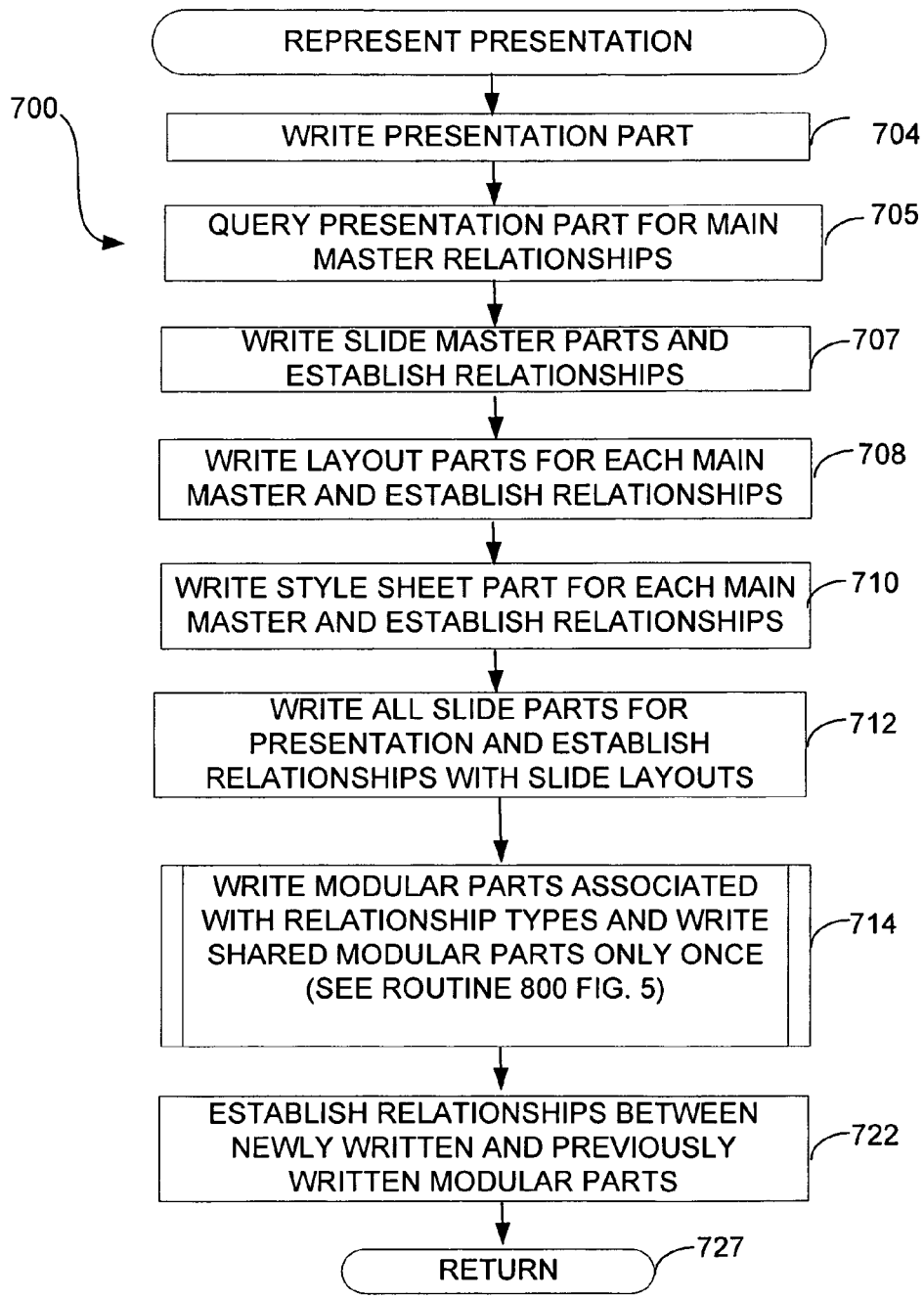
FIGS. 4-5 are illustrative routines performed in representing presentations in a modular content framework according to illustrative embodiments of the invention.
Figure 5:
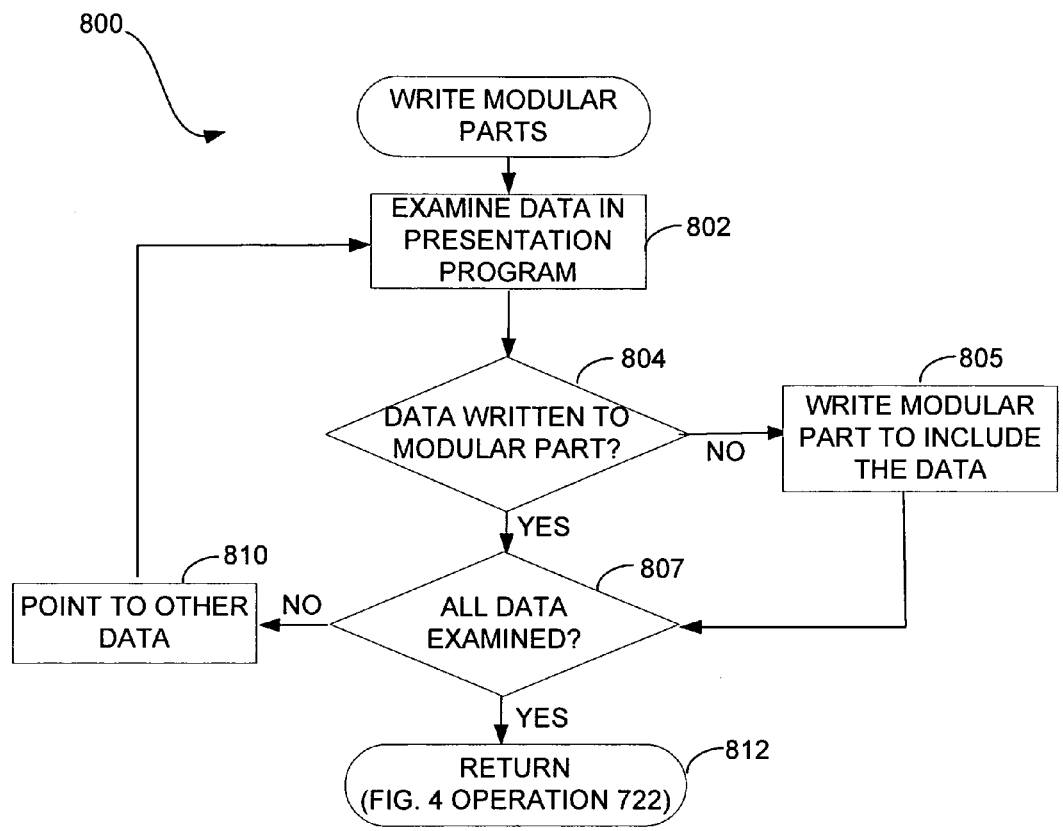

FIGS. 4-5 are illustrative routines performed in representing presentations in a modular content framework according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIGS. 2a, 2b and 4, the routine 700 begins at operation 704, where the presentation application program 10 writes the presentation part 210. The routine 700 continues from operation 704 to operation 705, where the presentation application program 10 queries the presentation for slide master relationships. Next, at operation 707, the presentation application writes the slide master parts 225 referenced in the presentation part 210 and establishes relationships between each slide master part 225 and the presentation part 210.

Next, at operation 708, the presentation application 10 writes slide layout parts for each slide master part 225 and establishes relationships between the slide layout parts and the slide master parts. Then at operation 710, the presentation application 10 writes a style sheet part for each slide master and establishes a relationship between the slide master part and the style sheet part. The routine 700 then continues to operation 712, where the presentation application writes all slide parts for the presentation and establishes a relationship between the slide parts and the corresponding slide layout part.

Then at operation 714, the presentation application 10 writes other modular parts associated with relationship types, such as the sound part, the image part, and the movie part associated with previously written modular parts. Any modular part to be shared between other modular parts is written only once. The routine 700 then continues to operation 722.

At operation 722, the presentation application establishes relationships between newly written and previously written modular parts. The routine 700 then terminates at return operation 727.

Referring now to FIG. 5, the routine 800 for writing modular parts will be described. The routine 800 begins at operation 802 where the presentation application 10 examines data in the presentation application. The routine 800 then continues to detect operation 804 where a determination is made as to whether the data has been written to a modular part. When the data has not been written to a modular part, the routine 800 continues from detect operation 804 to operation 805 where the presentation application writes a modular part including the data examined. The routine 800 then continues to detect operation 807 described below.

When at detect operation 804, the data examined has been written to a modular part, the routine 800 continues from detect operation 804 to detect operation 807. At detect operation 807 a determination is made as to whether all the data has been examined. If all the data has been examined, the routine 800 returns control to other operations at return operation 812. When there is still more data to examine, the routine 800 continues from detect operation 807 to operation 810 where the presentation application 10 points to other data. The routine 800 then returns to operation 802 described above.

Based on the foregoing, it should be appreciated that the various embodiments of the invention include file formats, methods and computer program products for representing presentations in a modular content framework. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having encoded thereon a file format representative of at least one of a presentation and a presentation template, the file format representing at least one of the presentation and the presentation template in a modular content framework implemented within a computing apparatus, the computer apparatus being operative to:

establish one or more relationships between a plurality of logically separate modular parts associated with the at least one of the presentation and the presentation template, wherein the one or more relationships are within a relationship hierarchy for the plurality of logically separate modular parts, the hierarchy comprising at least one explicit reference indicator indicating an explicit reference to a relationship in the content of a modular part and at least one non-explicit indicator indicating the utilization of features from a destination part by a modular part without an explicit reference, wherein each modular part is associated with a relationship type, wherein at least one of the plurality of logically separate modular parts is a global modular part used without limitation in the file format, wherein at least one of the plurality of logically separate modular parts is a non-global modular part which is shared on a limited basis in the file format, and wherein the modular parts include:

a presentation part representing a start part for at least one of the presentation and the presentation template; and a slide master part associated with the presentation part and operative to specify main components of at least one of the presentation and the presentation template;

interrogate each modular part separately without other modular parts being interrogated to increase efficiency when the at least one of the presentation and the presentation template is queried, wherein each modular part is one of extracted from and copied from the at least one of the presentation and the presentation template and reused in a different presentation or template along with associated modular parts identified by traversing inbound and outbound relationships of the modular part reused.

2. The computer-readable storage medium of claim 1, wherein the modular content framework includes a file format container associated with the modular parts wherein the modular parts further include:

a document properties part containing properties associated with the file format; and a thumbnail part containing thumbnails associated with the file format.

3. The computer-readable storage medium of claim 1, wherein the modular parts further include at least one of the following:

a slide layout part associated with the slide master part and operative to specify a structure of the presentation; and a slide part containing a slide in the presentation.

4. The computer-readable storage medium of claim 3, wherein the modular parts further include at least one of the following:

a style sheet part containing data associated with a style of a referring modular part;

a handout master part containing data associated with defining a style of handouts associated with the presentation;

a notes slide part containing notes associated with the slide;

a notes master part containing data associated with defining a style of a note slide associated with the notes;

a comments part containing comments associated with the presentation;

a thumbnail part containing thumbnails associated with the presentation;

a mail envelope part containing envelope data where a user of the presentation has sent the presentation via electronic mail; and a code file part containing code associated with the presentation.

5. The computer-readable storage medium of claim 4, wherein the modular parts further include at least one of the following:

an image part containing image data associated with the presentation;

a sound part containing audio data associated with the presentation;

a movie part containing movie data associated with the presentation;

an embedded object part containing an object associated with the presentation;

a user data part containing customized data, the customized data being read into the presentation and changed;

a font part containing data that defines fonts associated with the presentation; and a drawing object part containing an object built using a drawing platform.

6. The computer-readable medium of claim 5, wherein at least some of the modular parts are organized in collection types and wherein the collection types include at least one of the following:

a comments collection wherein the comments collection includes the comments part;

a drawings collection wherein the drawings collection includes the drawing object part;

a fonts collection wherein the fonts collection includes the font part;

a subdocument collection wherein the subdocument collection includes a modular parts that contain embedded documents associated with other modular parts in the presentation;

an images collection wherein the images collection includes the image part;

a slide layouts collection wherein the slide layouts collection includes the slide layout part;

a handout masters collection wherein the handout masters collection includes the handout master part;

a slide masters collection wherein the masters collection includes the slide master part;

a notes masters collection wherein the masters collection includes the notes master part;

a media collection wherein the media collection includes the movie and the sound parts;

a notes slides collection wherein the notes slides collection includes the note slides part;

a slides collection wherein the slides collection includes the slide part;

a styles collection wherein the styles collection includes the styles sheet part; and an embeddings collection wherein the embeddings collection includes the embedded object part and the user data part.

7. The computer-readable medium of claim 3, where the relationship types associated with the modular parts comprise at least one of a font relationship, a code file relationship capable of identifying potentially harmful code files, a user data relationship, a style sheet relationship, a comments relationship, an embedded object relationship, a drawing object relationship, an image relationship, a sound relationship, a movie relationship, a mail envelope relationship, a document properties relationship, a thumbnail relationship, a slide relationship, a notes slide relationship, a slide master relationship, a slide layout relationship, and a file format container embedded object relationship.

8. The computer-readable medium of claim 3, wherein content of the slide is one of extracted from and copied from the presentation and reused in a different presentation.

9. The computer-readable medium of claim 3, wherein each modular part is locked separately while the other modular parts remain available for locking whereby multiple editors each concurrently edit a modular part of the file format.

10. The computer-readable medium of claim 3, wherein the modular parts provide semantics about content within the presentation when a modular part is interrogated.

11. The computer-readable medium of claim 3, wherein the slide is authored in an authoring context of the presentation and wherein the slide is one of extracted from and copied from the presentation and moved to a different presentation and wherein the slide is further altered to appear as though the slide was authored in an authoring context of the different presentation.

12. The computer-readable medium of claim 1, wherein the file format is formatted according to at least one of a markup language format and a binary format.

13. A method for representing a presentation in a file format wherein modular parts associated with the presentation include each part written into the file format, the method comprising:
    writing a presentation part of the file format;
    querying the presentation part for a slide master relationship type;
    writing a slide master part of the file format separate from the presentation part;
    establishing a relationship between the slide master part and the presentation part, wherein the relationship is within a relationship hierarchy for the modular parts, the hierarchy comprising at least one explicit reference indicator indicating an explicit reference to a relationship in the content of a modular part and at least one non-explicit indicator indicating the utilization of features from a destination part by a modular part without an explicit reference;
    writing a slide layout part separate from the slide master part; and
    establishing a relationship between the slide layout part and the slide master part, wherein each part is one of extracted from and copied from the presentation and reused in a different presentation along with associated parts identified by traversing inbound and outbound relationships of the part reused.

14. The method of claim 13, further comprising establishing a relationship between the presentation part and a file format container wherein the file format container includes:
    a document properties part containing properties associated with the file format; and
    a thumbnail part containing thumbnails associated with the file format.

15. The method of claim 13, further comprising writing a slide part separate from the slide master part and containing a slide for the presentation and establishing a relationship between the slide part and the slide layout part.

16. The method of claim 15, further comprising:
    writing modular parts associated with relationship types wherein the modular parts that are to be shared are written only once; and
    establishing relationships to the modular parts written.

17. The method of claim 16, wherein writing the modular parts associated with the relationship types comprises at least one of the following:
    writing a style sheet part containing data associated with a style of the presentation and establishing a relationship between the style sheet part and the slide master part;
    writing a notes slide part containing notes associated with the slide and establishing a relationship between the notes slide part and the slide part;
    writing a mail envelope part containing electronic mail envelope data and establishing a relationship between the mail envelope part and the presentation part; and
    writing a code file part containing code associated with the presentation and establishing a relationship between the code file part and the presentation part.

18. The method of claim 16, wherein writing the modular parts associated with the relationship types comprises:
    a) examining data associated with the presentation;
    b) determining whether the data examined has been written to a modular part;
    c) when the data examined has not been written to the modular part, writing the modular part to include the data examined, examining other data associated with the presentation, and repeating b) through c) until all of the data associated with the presentation has been examined; and
    d) when the data examined has been written to the modular part, examining other data and repeating b) through d) until all of the data associated with the presentation has been examined.

19. A computer program product comprising a computer-readable storage medium having control logic stored therein for causing a computer to represent a presentation in a file format wherein modular parts of the file format include each part written into the file format, the control logic comprising computer-readable program code for causing the computer to:
    write a presentation part of the file format;
    query the presentation part for a slide master relationship type;
    write a slide master part of the file format separate from the presentation part;
    establish a relationship between the slide master part and the presentation part, wherein the relationship is within a relationship hierarchy for the modular parts, the hierarchy comprising at least one explicit reference indicator indicating an explicit reference to a relationship in the content of a modular part and at least one non-explicit indicator indicating the utilization of features from a destination part by a modular part without an explicit reference;
    write a slide layout part separate from the slide master part; and establish a relationship between the slide layout part and the slide master part, wherein each part is one of extracted from and copied from the presentation and reused in a different presentation along with associated parts identified by traversing inbound and outbound relationships of the part reused.

* * * * *